(12) United States Patent
Orlitzky et al.

(10) Patent No.: US 6,408,985 B1
(45) Date of Patent: *Jun. 25, 2002

(54) MOTOR DRIVEN LUBRICATOR

(76) Inventors: Anton Orlitzky, 343 Rose Wynd, Delta, British Columbia (CA), V4M 3L8; Helmut Fandrich, 2461 Sunnyside Place, Clearbrook, British Columbia (CA), V2T 4C4

( * ) Notice: Subject to any disclaimer, the term of this patent is extended or adjusted under 35 U.S.C. 154(b) by 0 days.

This patent is subject to a terminal disclaimer.

(21) Appl. No.: 08/278,116

(22) Filed: Jul. 18, 1994

Related U.S. Application Data

(63) Continuation-in-part of application No. 08/091,776, filed on Jul. 14, 1993, now abandoned, which is a continuation of application No. 07/919,173, filed on Jul. 23, 1992, now abandoned.

(51) Int. Cl.[7] .................................................. F16N 11/08
(52) U.S. Cl. ........................ 184/37; 184/45.1; 184/38.4; 184/105.2
(58) Field of Search ............................... 184/27.1, 45.1, 184/37, 105.2, 38.4; 222/63, 333, 256, 260, 261, 262, 339, 340, 386, 390; 92/140; 417/415, 374

(56) References Cited

U.S. PATENT DOCUMENTS

| 1,162,997 A | | 7/1915 | Ferguson | |
|---|---|---|---|---|
| 1,692,319 A | * | 11/1928 | Zerk | 184/29 |
| 2,694,508 A | * | 11/1954 | Petrenchak | 222/333 |
| 2,965,198 A | * | 12/1960 | Williams et al. | 184/37 |
| 3,815,787 A | * | 6/1974 | Spies | 222/390 |
| 3,861,567 A | * | 1/1975 | Davis, Jr. | 222/333 |
| 3,984,033 A | * | 10/1976 | Groth et al. | 222/333 |
| 4,147,233 A | * | 4/1979 | Smith | 184/29 |
| 4,171,072 A | | 10/1979 | Davis, Jr. | |
| 4,257,540 A | | 3/1981 | Wegmann et al. | |
| 4,368,803 A | * | 1/1983 | Dombroski et al. | 184/15.1 |
| 4,671,386 A | | 6/1987 | Orlitzky | |
| 4,796,787 A | * | 1/1989 | Tsuyuki | 222/333 |
| 5,022,556 A | * | 6/1991 | Dency et al. | 222/63 |
| 5,105,912 A | * | 4/1992 | Heister | 222/333 |
| 5,271,528 A | | 12/1993 | Chien | |

FOREIGN PATENT DOCUMENTS

| CH | 166690 | * | 3/1934 | 222/333 |
|---|---|---|---|---|
| DE | 20 13 504 | | 3/1969 | |
| DE | 2013504 | * | 10/1970 | 222/333 |
| IT | 347340 | * | 4/1937 | 222/333 |
| SU | 316415 | * | 12/1971 | 222/333 |
| TW | 80214553 | | 10/1992 | |

\* cited by examiner

*Primary Examiner*—Thomas Denion

(57) ABSTRACT

A lubricating apparatus comprising a chamber to receive lubricant, an outlet for lubricant, a movable member to drive lubricant from the chamber through the outlet, and a control circuit for periodically activating the motor to dispense lubricant according to a preset schedule. A motor and drive shaft are attached to the movable member through a transmission. Activating the motor in accordance with operator-selected instructions from a pre-programmed microprocessor moves the transmission to drive the movable member towards the outlet to force lubricant therefrom. The apparatus avoids the disadvantage of the prior art which relies on the generation of gas to provide pressure to force lubricant from the apparatus.

3 Claims, 5 Drawing Sheets

MOTOR DRIVEN LUBRICATOR

RELATION TO OTHER APPLICATIONS

This is a continuation-in-part of Appl. Ser. No. 08/091,776 filed Jul. 14, 1993 now abandoned which in turn is a continuation of Appl. Ser. No. 07/919,173 filed Jul. 23, 1992 now abandoned.

FIELD OF THE INVENTION

This invention relates to a lubricating apparatus, more particularly to a lubricating apparatus able to provide grease or other lubricant automatically to a location, that is without manual intervention.

DESCRIPTION OF THE PRIOR ART

Automatic greasing equipment is well known. The equipment has the virtue of providing a constant supply of lubricant to a bearing, shaft or anything else that needs to be lubricated, without manual interference. It is not necessary to keep a schedule of what bearings need to be lubricated, and it is ideal for bearings and shafts in difficult locations, whether that location be merely inaccessible or inhospitable by virtue of extreme temperatures and the like. The lubricating apparatus provides a constant flow of grease.

The best known method in the prior art of applying the grease is to generate gas pressure in a lubricator above a supply of the grease. The grease is then forced out of the lubricator. Gas pressure may be developed by chemical reaction. The gas generates the necessary pressure to force the grease from the outlet of the lubricator.

The prior art has used a neoprene or rubber diaphragm to be distended by the gas and to force the grease out. In addition applicant's Canadian patent 1,280,700, and the several patents that correspond to it, describe and claim the use of a bellows. The bellows has the advantage of providing more consistent performance than the diaphragm.

The prior art equipment has proved to be reliable and long-lasting. Apparatus developed by applicant is able to provide lubrication of a bearing for up to three years. As a result it has achieved excellent acceptance in the art.

There is, however, still room for improvement. For example, there is a need to achieve more consistent and more prompt feed of grease for all conditions and the present invention is addressed to that need.

SUMMARY OF THE INVENTION

Accordingly the present invention provides a lubricating apparatus comprising a chamber to receive a lubricant and having an outlet for lubricant, a movable member movable to drive lubricant from the chamber, through the outlet, a motor having a drive shaft, drive means driven by the motor and attached to the movable member, whereby rotation of the motor moves the drive means to drive the movable member towards the outlet to force lubricant from the outlet.

The movable member may be a piston that is a close fit within the chamber, or a bellows. It may be a shaft urged downwardly by the motor.

Usually the motor will be an electric motor and it is desirable that the apparatus include a battery for the motor. A battery is not essential. For example, the motor can be driven from the mains. Nevertheless, it is normally considered desirable to have the apparatus of the present invention completely self-contained during its operating life.

The apparatus should include switches and controls for the electric motor. Thus, the present invention further comprises a programmable electronic control circuit for establishing pre-selected times and durations at which the electric motor is turned on, thereby controlling delivery of lubricant from the outlet.

DESCRIPTION OF THE DRAWINGS

The invention is illustrated, by way of example, in the drawings, in which.

THE MECHANICAL ASPECTS OF THE INVENTION

Figure 1:
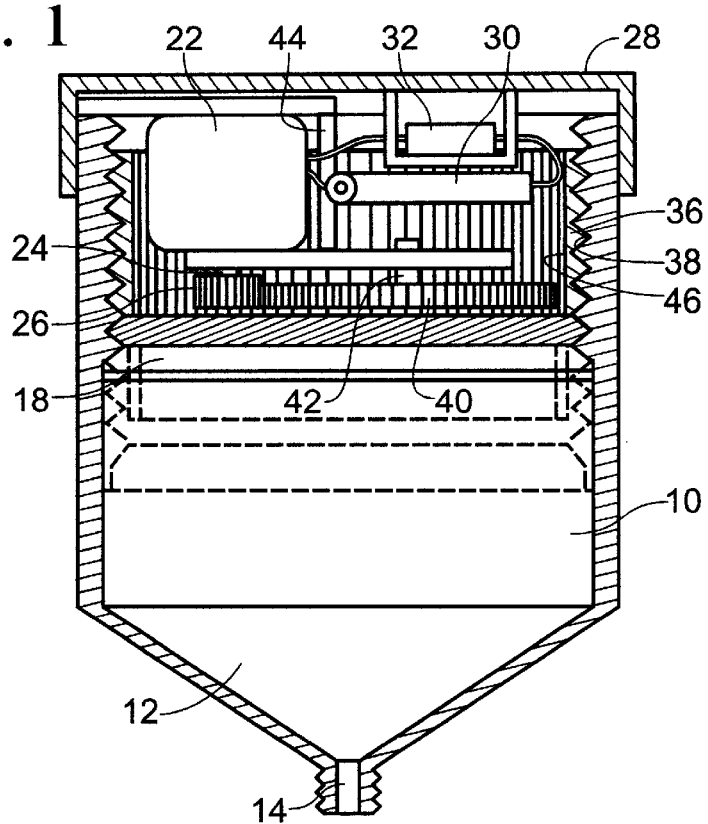
FIGS. 1 through 5 are sections through embodiments of the present invention.
Figure 2:
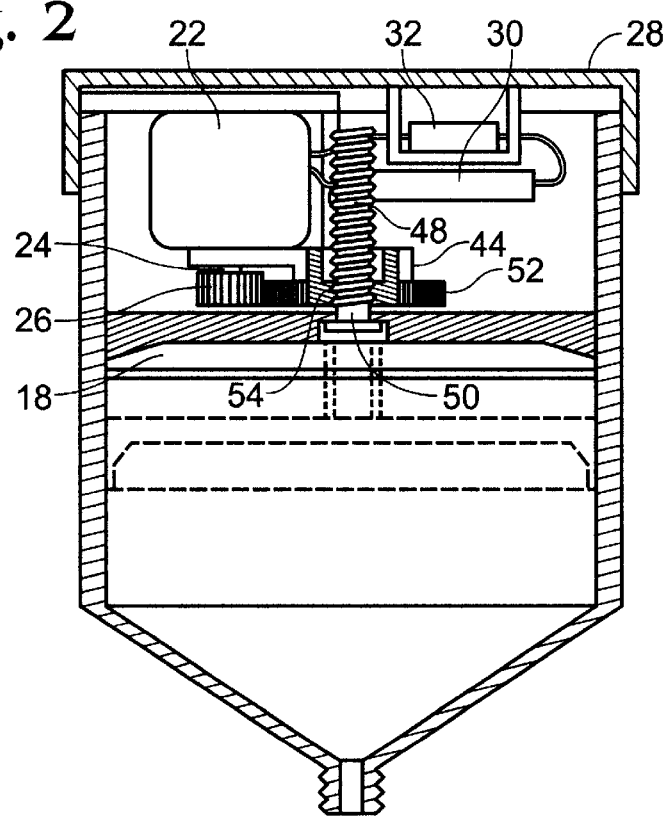
Figure 3:
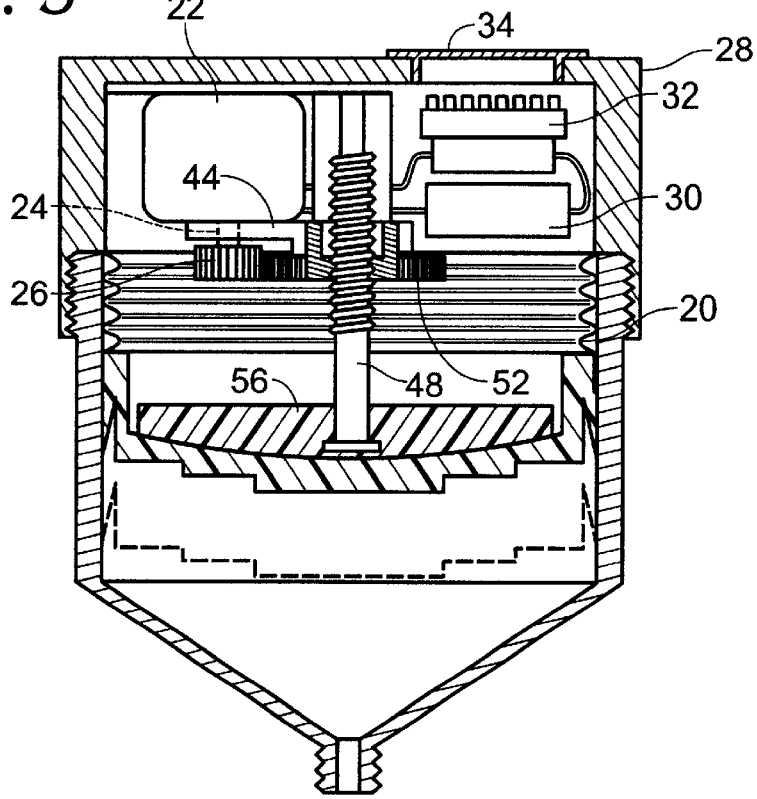
Figure 4:
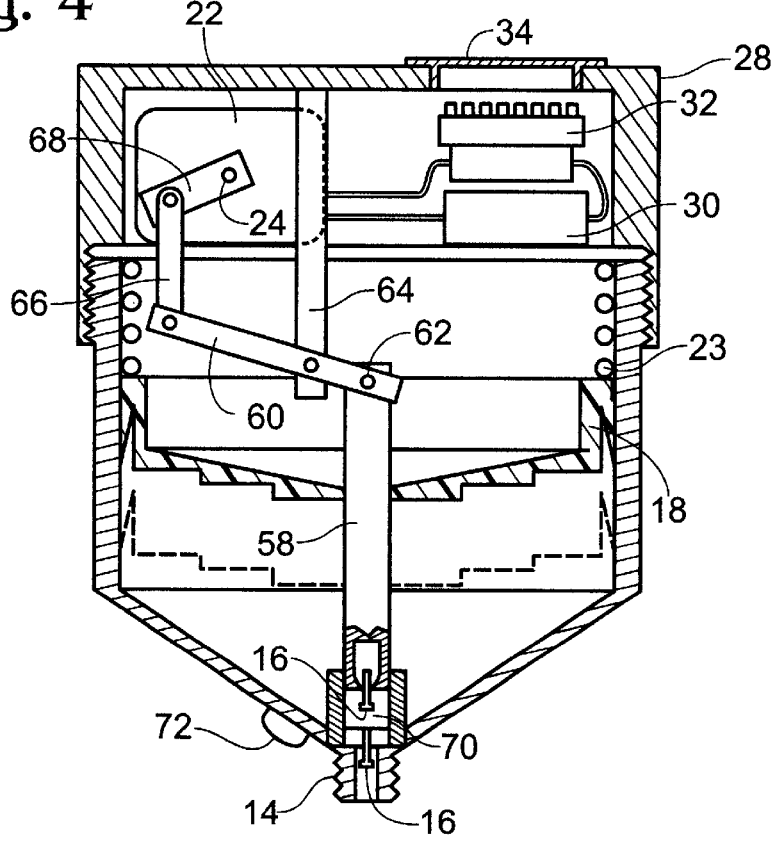
Figure 5:
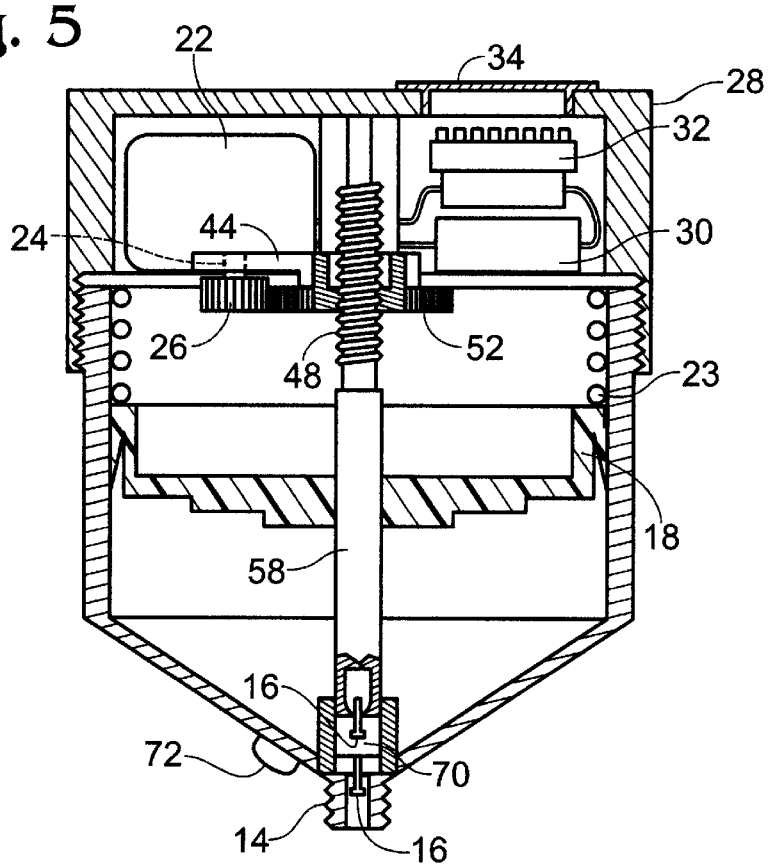

FIGS. 1 to 5 show a lubricating apparatus comprising a chamber 10 to receive a lubricant 12 and having an outlet 14 for the lubricant 12. In the embodiments of FIGS. 4 and 5, check valves 16 are shown in the outlets to control the flow of lubricant outwardly. The apparatus has a movable member that defines an upper wall of the chamber 10 and is movable to drive lubricant from the chamber, through the outlet 14. In FIGS. 1 and 2 the movable member is a piston 18, in FIG. 3 the movable member is a bellows 20 having extendible sides, and in FIGS. 4 and 5 the movable member is a central shaft 58. In FIGS. 4 and 5, a spring 23 tends to urge the piston 18 downwardly exerting a constant pressure. Check valves 16 are used in these embodiments to prevent inadvertent feed of lubricant 12 by spring pressure alone.

The apparatus includes a motor 22 having a drive shaft 24. A pinion 26 is mounted on the drive shaft 24. There are drive means driven by the motor 22 and connected to the movable member 18 or 20. These drive means are more fully discussed below. The arrangement, at least in FIGS. 1 to 3, is such that rotation of the drive shaft 24 moves the drive means to drive the movable member 18 or 20 towards the outlet 14 to force lubricant from the outlet 14. In FIGS. 4 and 5 a shaft is urged downwardly as discussed below.

The apparatus includes a lid 28 that can be removed. The motor 22, the drive means and movable member 18 or 20 can be removed and a frangible envelope filled with lubricant, for example grease, can be placed in the lower part of the chamber 10. The application of pressure bursts the envelope to allow grease to be forced from the outlet.

The preferred motor 22 is an electric motor. Such motors are very compact, have excellent torque characteristics, are durable and can operate at a wide range of temperatures.

The apparatus includes a battery 30 for the motor and switches and controls 32 for the electric motor 22. These switches and controls ensure that the motor 22 is turned on intermittently according to a pre-set program and operates for a pre-set time, sufficient to drive an adequate amount of lubricant from the outlet 14 onto the item to be lubricated. Access to the controls 32, for example to vary the settings, can be achieved through closure 34, shown in FIGS. 3,4 and 5 closure 34.

FIGS. 1 to 5, in the main, differ in the various forms of drive means used.

FIG. 1 shows a thread 36 on the exterior of the piston 18 and a corresponding, intermeshed thread 38 on the interior of the chamber 10. Pinion 26 engages a gear wheel 40, rotatably mounted on shaft 42 which is mounted on a frame 44 within the apparatus. The interior of the piston 18 is also provided with gear teeth 46 that engage the gear wheel 40. When current is supplied to the motor 22 drive shaft 24 rotates turning the gear wheel 40. The gear 40, in rotating, rotates the piston 18. The threads 36 and 38 translate the rotation to linear motion, driving the piston 18 towards the outlet 14 and thus forcing lubricant 12 from the outlet.

In FIG. 2 the drive comprises a power screw 48 attached by a rotatable joint 50 to the piston 18. In this embodiment, pinion 26 on the drive shaft 24 of the motor 22 rotates a gear wheel 52 having an internal thread 54. That internal thread 54 matches the thread on the power screw 48. The gear wheel 52 is mounted on a frame 44 in the apparatus. With this embodiment, rotation of the drive shaft 24 drives the gear wheel 52. Again the engaged threads—the thread of the power screw 48 and the internal thread 54 of the gear wheel 52—translate the rotational movement into linear movement, moving the piston 18 down towards the position shown in broken lines in FIG. 2, thus forcing lubricant 12 from the outlet 14.

In FIG. 3 the arrangement is similar to that in FIG. 2 except that the piston is replaced by a bellows 20. A housing 56 receives power screw 48.

FIG. 4 shows the use of levers. Piston 18 slides on a central shaft 58. A first lever 60 attaches to the shaft 58 at 62. A fulcrum 64 mounts the first lever 60. The fulcrum 64 is mounted within the apparatus. The first lever 60 is attached through link members 66 and 68 to the output shaft 24 of the motor 22. A small movement of the drive shaft 24 moves first link member 68 clockwise. This movement is transmitted to the second link member 66 and thence to the outer end of the first lever 60. The outer end of first lever 60 moves upwardly, moving the central shaft 58 downwardly.

FIG. 5 includes features of both FIGS. 3 and 4. As in FIG. 4, piston 18 slides on central shaft 58. The drive means of the central shaft 58 is as shown in FIG. 3 for power screw 48.

In both FIGS. 4 and 5 the piston 18 is urged towards the outlet 14 by springs 23. Piston 18 slides on shaft 58. There is an outlet chamber 70 adjacent outlet 14. Ingress into and egress from outlet chamber 70 is controlled by check valves 16. Each check valve 16 is spring loaded in conventional manner (not shown) with springs that are sufficiently strong to overcome the pressure of spring 23. In this way check valves 16 prevent lubricant from being forced from outlet 14 by the pressure of spring 23 alone. However, downward movement of shaft 58, induced by rotation of drive shaft 24 overcomes the resistance of check valve 16 and forces lubricant from outlet 14. Spring 23 ensures that the lubricant is urged towards outlet 14 and is kept under constant, mild pressure so that there is always a supply of lubricant to chamber 70.

In all embodiments there tends to be a back pressure induced once the drive shaft 24 stops turning. In this way the lubricant within the main chamber 10 is not kept under constant pressure. There is some pressure in the embodiments of FIGS. 4 and 5 but it is slight. In FIGS. 4 and 5 the back pressure means that the shaft 58 tends to move backwardly to the position shown in FIGS. 4 and 5, that is to a position in which further lubricant can be driven through the outlet chamber 70.

FIGS. 4 and 5 show the use of a filler 72 through which main chamber 10 can be refilled with lubricant 12.

Outlet 14 may be inclined from the positions shown in the drawings if the intended location requires it.

Figure 6:
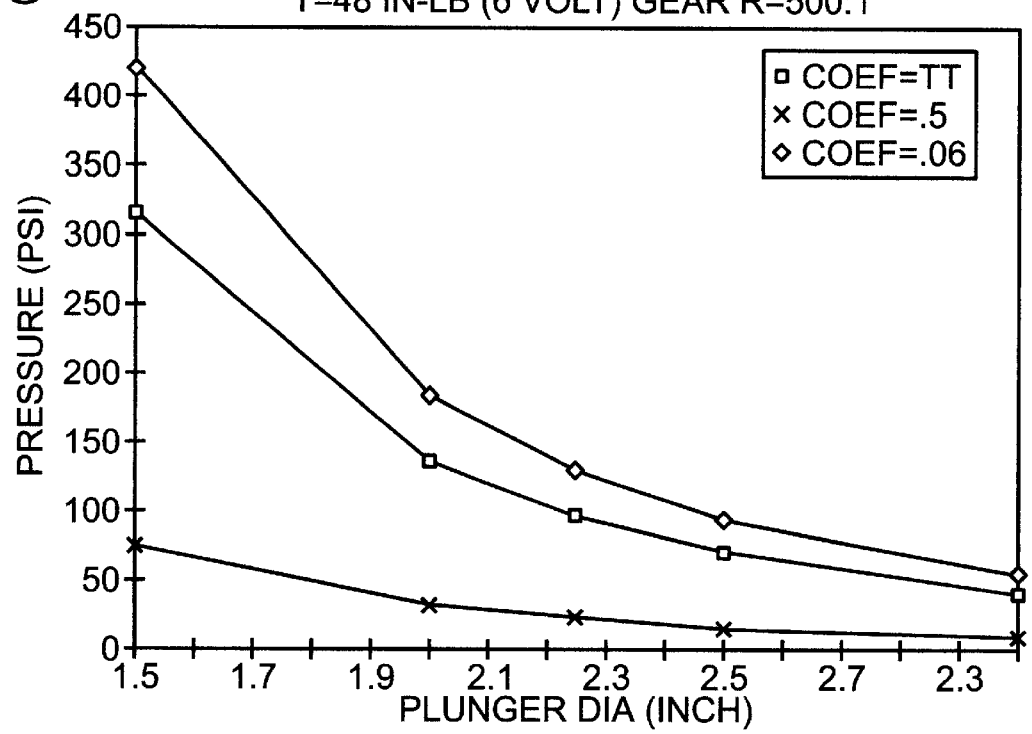
FIGS. 6 to 8 are graphs relating pressure to the diameter of the movable member for varying features of the invention.
Figure 7:
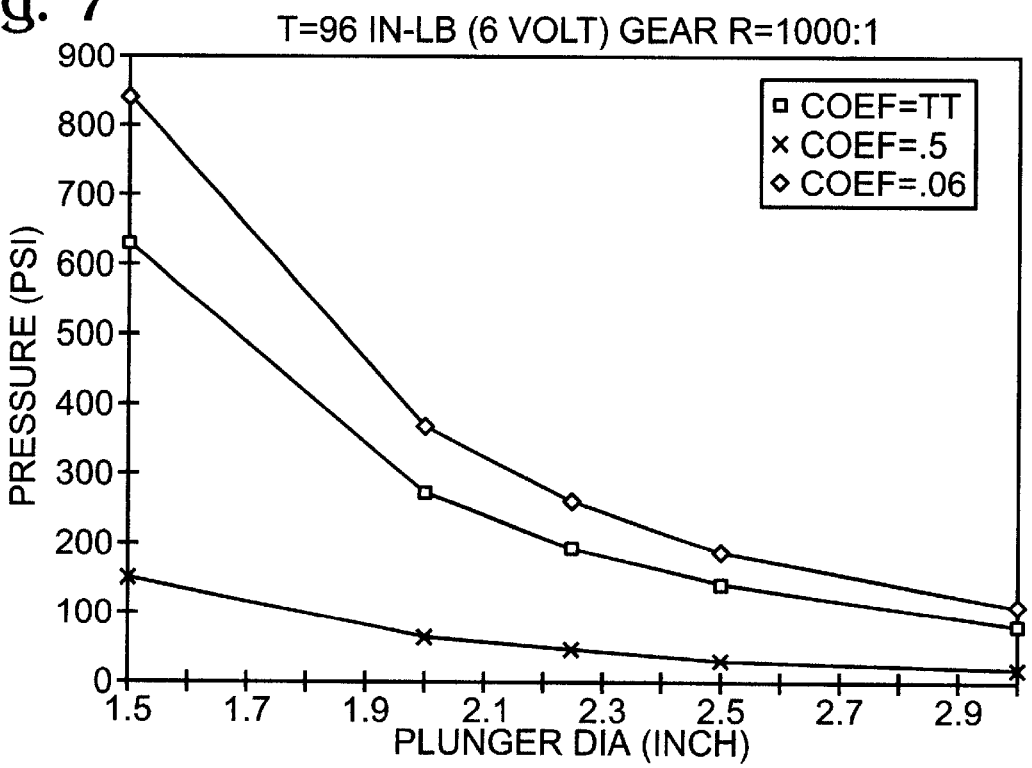
Figure 8:
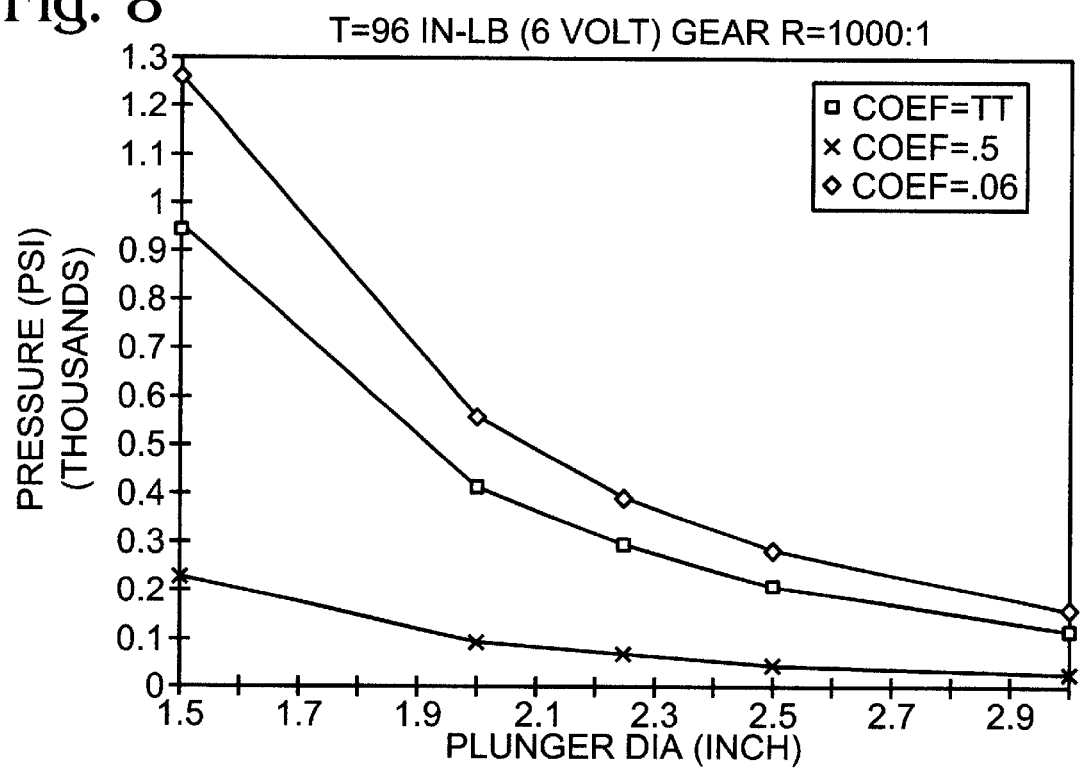

FIGS. 6 to 8 illustrate the results achieved using the invention. These are graphs relating pressure to the diameter of the movable member, that is to say the internal diameter of the chamber. In FIG. 6 the torque was 48 inch pounds from a 6 volt electric motor. The various plots show the different coefficient of friction for power screw 48 as indicated on the drawing. FIG. 7 shows a gear ratio of 1000 to 1 and FIG. 8 a gear ratio of 1500 to 1. The gear ratio can be varied easily as, it is believed, will be apparent from FIGS. 1 to 5.

The graphs show that it is possible to achieve a pressure of 100 psi using 6 volt batteries and hardened steel power screws to keep the coefficient of friction below 0.1. Using a 500 to 1 gear ratio (FIG. 6) the maximum piston diameter is about 2¼ inches. If an additional two to one ratio is incorporated to bring the total gear ratio to 1000 to 1 (FIG. 7) then the maximum diameter possible is about 2¾ inches. Adding a 3 to 1 ratio for a total gear ratio of 1500 to 1 (FIG. 8) the maximum diameter possible is about 3¼.

It will be appreciated that, in general, a larger diameter is desirable as it permits greater volume of grease to be used. Using a 6 volt battery, a piston diameter of 2½ inches, a 2 to 1 gear ratio on the end of a 500 to 1 gear head and with a lubricated steel power screw it is possible to generate a pressure of no less than 140 psi.

The apparatus of the present invention has a number of advantages over the prior art. With the present invention, the flow of lubricant is nearly independent of temperature and back pressure from the bearing. There is no gas to compress, as in the prior art lubricators; the distance that the piston is displaced is proportional to the volume lubricant dispensed.

In the prior art equipment temperature has an effect on gas volume and on the gas generation rate. However, the pressure generated in the present invention acts only on liquids or solids, which are not compressible. Furthermore the pressure required to move the piston, and hence the lubricant, does not need to be generated and developed before the device can dispense lubricant. The device of the present invention develops pressure against back pressure in the bearings instantly. In the prior art equipment the gas generating system would, typically, be set to work at sea-level pressure of one atmosphere. It would therefore require gas generation to greater than one atmosphere pressure to work properly and feed the required amount of lubricant. There is also a delay in converting the electric energy to chemical energy, to produce the gas. However, in the present application, the current automatically increases when the line resistance increases.

Furthermore, there is only minor variation in the current generated by the battery as ambient temperature changes and the variation is only significant when maximum pressure is present. Electric motors can work at temperatures of 100° C. for short durations for months. The battery power supply, such as a simple silver oxide cell, can work up to 90° C. without difficulty.

The quantity of lubricant dispensed is proportional to piston displacement and that is proportional to the number of revolutions of the motor. Higher back pressure means only that the motor will draw more current. The control circuit will shut off the motor once the required pre-set number of revolutions has taken place. The control circuit will start up the motor once the pre-set time interval has taken place.

It is a simple matter to build in a means to generate an alarm signal to warn when the lubricant is used.

Tests indicate that the system can be reused a minimum of ten times before the power supply needs to be replaced. There are no chemicals or residues that will be left over, only a plastic bag, assuming that a bag has been used to contain the lubricant. In fact, it is not essential that the bag be present.

THE ELECTRONIC CONTROL CIRCUIT

Figure 9:
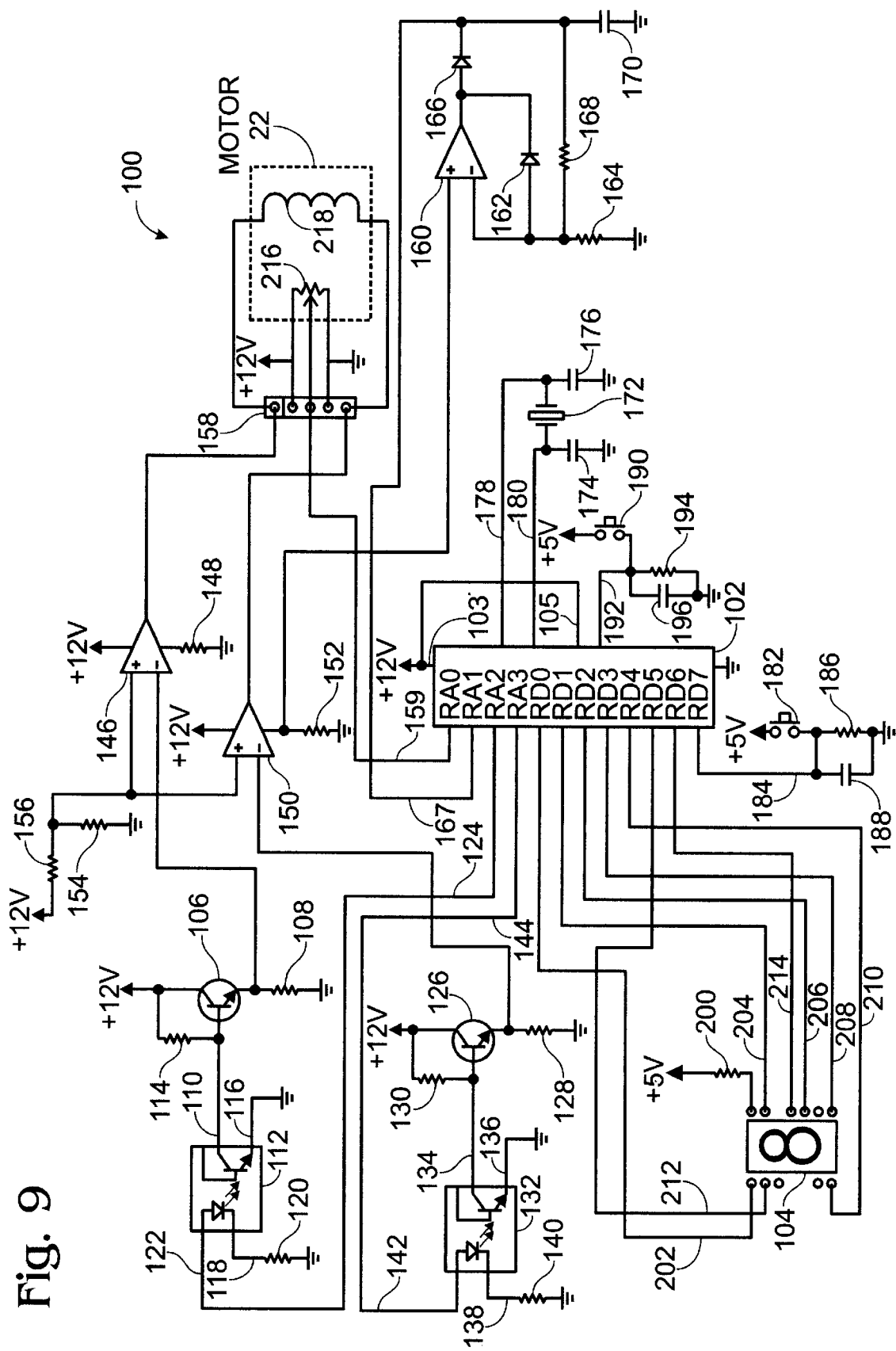
FIG. 9 shows a diagram of the electronic circuitry of the invention used to control the delivery of lubricant.

FIG. 9 shows in circuit 100 the details of control 32, which automatically governs the timing and duration of the operation of motor 22 and hence the dispensation of lubricant as previously described. Operation of circuit 100 depends primarily on the operation of programmable microprocessor (PM) 102, which may, e.g., be a PIC16C71 microprocessor. In such case, PM 102 is characterized by a ROM-based 8-it CMOS microcontroller with 13 I/O pins, a power saving SLEEP mode, 35 single word instructions, a 1024×14 bit on-chip EPROM program memory, 36×8 general purpose registers (SRAM), 15 special hardware registers, an 8 level deep hardware stack, direct-indirect and relative addressing modes, four interrupt sources, and an A/D converter. PM 102 connects through pins 103 and 105 thereof to a +V voltage, e.g., 12 volts. PM 102 is programmed at the time of manufacture to control the operation of motor 22.

Circuit 100 further comprises an LED display 104 by which the programming of PM 102 is displayed as will be discussed in more detail below. Also included are a first transistor 106 (e.g., a standard npn transistor), which is connected such that the emitter connects through first resistor 108 to ground, the base connects through second transistor 110 to the collector, and the collector is connected to a +V source, e.g., 12 volts as from a battery (not shown). First transistor 106 is further connected at its base to first optoisolator 112 (e.g., a standard 4N35) at the collector 114 of an internal phototransistor, the emitter 116 of which connects directly to ground. First optoisolator 112 further comprises a photodiode of which the cathode 118 connects through third resistor 120 to ground, and the anode 122 of which connects to pin 124 of PM 102.

Similarly, circuit 100 further comprises second transistor 126 being connected from the emitter thereof through fourth resistor 12 8 to ground and from the base thereof through fifth resistor 130 to the collector thereof, said collector also being connected to a +V source, e.g., 12 volts. The base of second transistor 126 also connects to second optoisolator 132 at the collector 134 of the internal phototransistor thereof, the emitter 136 of which connects directly to ground. The cathode 138 of the internal photodiode of second optoisolator 132 connects through sixth resistor 140 to ground, and the anode 142 of said internal photodiode connects to pin 144 of PM 102.

First and second transistors 106, 126, first and second optoisolators 112, 132, along with their associated circuitry as just described serve to minimize the effect of electrical noise from motor 22 that could interfere with the operation of PM 102.

Circuit 100 further comprises first opamp 146 which connects from a +V voltage through seventh resistor 148 to ground, and second opamp 150 which also connects from a +V voltage through an eighth resistor 152 to ground. First opamp 146 receives at its negative input terminal the output from the emitter of first transistor 106, and second opamp 150 receives at its negative input terminal the output from the emitter of second transistor 126. The positive terminals of first and second opamps 146, 150 both connect through ninth resistor 154 to ground, and also through tenth resistor 156 to a +V voltage. As before, the said +V voltage may be +12v from a battery. The outputs of first and second opamps 146, 150 connect through motor connector 158 to the field coils of motor 22 shown in FIGS. 1–5. The center connector of motor connector 158 connects to terminal 159 of PM 102. Of course, first and second opamps 146, 150 may be, and typically will be, paired opamps on a single chip and having common +V connections, as, for example, a standard type L272.

Also shown in circuit 100 of FIG. 9 is a current sampling circuit, commencing with a connection from the emitter of second transistor 150 to the positive input of third opamp 160. First diode 162 connects anode-to-cathode in parallel to the negative input and the output of third opamp 160, which in this case may be a type LM358. That negative input is also connected through eleventh resistor 164 to ground. Second diode 166 connects the output of third opamp 16 (and the cathode of first diode 162) to ground through first capacitor 170, and also to terminal 167 of PM 102. Twelfth resistor 168 is connected in parallel to anode of first diode 162 and the cathode of second diode 166. The aforesaid current sampling circuit serves to protect against possibly damaging overload conditions by first detecting excess current and then signalling that condition through line 167 to PM 102 which then shuts downs circuit 100.

Timing for the operation of PM 102 is provided by crystal 172, opposite sides of which are connected to ground through respective second and third capacitors 174, 176, and likewise to timing pins 178, 180 of PM 102. As is well known in the art, a microprocessor such as PM 102 can be used to provide timing pulses at a predetermined interval, given the presence of a time standard such as that just noted to be provided by crystal 172. The specific mode of operation of PM 102 as employed to control motor 22 in the present invention will now be described.

As previously indicated, motor 22 serves to operate drive shaft 24 which in the several embodiments will in turn ultimately cause movement of either piston 18 in FIGS. 1, 2, 4 and 5 or bellows 20 in FIG. 3. A downward movement in either case will cause a flow of lubricant 12 from outlet 14, while an upward movement merely readies the apparatus for a similar dispensation of lubricant in the manner of a normal grease gun. Thus, in a downward stroke motor 22 is activated for such period of time as will cause drive shaft 24 to rotate from some starting position through an angle of less than 180 degrees, and in an upward stroke the polarity in the field coils of motor 22 is reversed so that drive shaft 24 rotates that same angle in magnitude but in the opposite direction, thus returning drive shaft 24 to that starting position. The combination of one downward stroke and one upward stroke constitutes a complete pump cycle.

In a particular lubrication sequence, the timing of the operation of motor 22 also includes two delay periods, i.e., a first delay t following a downward stroke before the upward stroke is commenced, and similarly a second delay p following an upward stroke before the next following downward stroke is commenced. Additional parameters are (1) the number N of complete pump cycles which follow one another as just described during a particular lubrication sequence; and (2) an interval T following execution of such a lubrication sequence before another such sequence is begun. First and second delay periods t and p are established through programming of PM 102, as is also the number of pump cycles N in each lubrication sequence, whereas interval T is in part programmed into PM 102 and is in part operator controlled through circuit 100.

That is, circuit 100 further comprises mode switch 182, which may be of a simple push-button type, and connects on a first side thereof to an external voltage (e.g., 5 volts), and on the second side thereof both to terminal 182 of PM 102 and to ground through a parallel circuit consisting of thirteenth resistor 186 and fourth capacitor 188. The aspect of determining interval T that is programmed through PM 102 lies in the programming therein of a range of possible T values, which is to say that for different operating modes, PM 102 may be programmed to provide intervals T between successive lubrication sequences of, e.g., mode A=1 hour; mode B=2 hours, mode C=3 hours, mode D=4 hours, and so on, the particular mode to be selected being determined by the operator on the basis of the lubrication requirements of the particular device to which the embodiment of the invention is attached. The particular mode of operation that an operator will have selected is made known through LED display 104, as will be described further below.

It is also useful for an operator to be able to determine at what particular stage in the life of the device an embodiment of the invention happens to be at some particular time. Programming of PM 102 may, for example, be limited to accommodate just 16,000 cycles of operation, after which the unit will no longer be useable and must be replaced, and the operator may wish to determine the remaining lifetime of a particular unit. That information is also provided by LED display 104, which basically comprises a seven-segment LED indicator that shows one character (alpha or numeric) at a time, on which the number of pump cycles that a particular unit has carried out is shown. That display is obtained through the use of stroke counter switch 190 shown in circuit 100, which like mode switch 182 may be of a simple push-button type. Stroke counter switch 190 connects on a first side thereof to a +V voltage (e.g., 5 volts), and on a second side both to terminal 192 of PM 102 and to ground to a parallel circuit consisting of fourteenth resistor 186 and fifth capacitor 188.

In operation, LED display 104 shows either a count of the cycles that have previously been executed by a particular device, or the mode (in terms of the interval T) in which the apparatus is operating. Of course, different standard LED devices may be employed in this context, but the particular LED display 104 shown in circuit 100 operates sequentially in that, upon touching stroke counter switch 190, for example, and at a time at which the unit has proceeded through, e.g, 8,574 cycles, LED display 104 will momentarily display the digit "8," clear itself for a brief period (e.g., one second), display the digit "5," again clear itself, display a "7," briefly clear itself, and then display the digit "4," The same procedure will of course be carried out so as to exhibit in sequence the digits that at any other particular time represent some other number of such completed cycles, as counted by PM 102.

Display of the mode of operation of the device occurs similarly, except that touching of mode switch 182 both causes a display on LED display 104 of the current mode of operation and permits changing of that mode. That is, mode switch 182 acts (in the example given above) as a four-position toggle switch: repeated touching of mode switch 182 (or simply holding the same down) will successively display the letters "A," "B," "C," "D," and thence back to "A," etc., commencing with that one of those letters which represents the mode of operation in which the device was last left operating, and upon a second and subsequent activation of mode switch 182, the mode of operation which next occurs in that sequence is both (1) selected within PM 102 and (2) displayed on LED display 104. Thus, the operator is able to terminate such a series of activations of mode switch 182 (or release mode switch 182 after holding it down) at a time at which the specific mode of operation then desired is shown on LED display 104. Of course, the number of such modes of operation that have been preprogrammed within PM 102, and will thus be shown and can be selected as just stated using LED display 104, may be lesser or greater than the four used in the above example. Similarly, depending upon estimates of the rigors to which the device may be subjected, different programming with PM 102 may be used to provide different instances of the invention that will have a lifetime greater or lesser than the 16,000 cycle example previously mentioned.

The interconnections between PM 102 and LED display 104 which effect such operation are shown in circuit 100 and are summarized in the following Table I. Initially, LED 104 connects from terminal 198 thereof through fifteenth resistor 200 to a +V source, e.g., 12 volts. Table I then shows in the first column the connection terminology for the first nine connections of the particular PIC16C71 microprocessor (i.e., of PM 102) using standard nomenclature; in the second column the corresponding number designations applied to the lines connecting thereto in circuit 100 in FIG. 9; in the third column, the standard nomenclature for the second nine connections of PM 102; and in the fourth column again the terminal number designations of circuit 100 which correspond to those latter nine connections to PM 102. In the case of connections from PM 102 which lead to terminals of LED display 104 (i.e., the RD0–RD6 connectors), the numerical designations shown in the second and fourth columns of Table I represent both the terminal of LED display 104 itself and the line leading thereto.

TABLE I

| RA0 | 159 | RD5 | 212 |
|-----|-----|-----|-----|
| RA1 | 167 | RD6 | 214 |
| RA2 | 124 | RD7 | 184 |
| RA3 | 144 | VDD | 103 |
| RD0 | 202 | OSC1 | 178 |
| RD1 | 204 | OSC2 | 180 |
| RD2 | 206 | /MCLR | 105 |
| RD3 | 208 | RTCC | 192 |
| RD4 | 210 | GND | Ground |

Also shown in FIG. 9 are the connections of circuit 100 to motor 22 by way of motor connector 158, wherein the center terminal thereof connects to the center connector of potentiometer 216; the next outermost pair of connections thereof connect to opposite ends of potentiometer 216 as well as to a +V source and ground as previously noted; and the outermost pair of connectors connect to opposite sides of field coil 218 of motor 22. The center conductor of potentiometer 216 is fixedly attached to the rotor structure of motor 22, so that in moving that rotor structure (i.e., the motor shaft has rotated as previously described), the center conductor moves likewise so as to detect a correspondingly different voltage which is then transmitted through line 159 to the RA0 connector of PM 102, whereupon it passes through an internal A/D converter to provide a digital signal that operates PM 102 as previously described.

It will be understood by those of ordinary skill in the art that other arrangements and disposition of the aforesaid components, the descriptions of which are intended to be illustrative only and not limiting, may be made without departing from the spirit and scope of the invention, which must be identified and determined only from the following claims and equivalents thereof.

We claim:

1. A lubricating apparatus comprising:
   a housing defining a main lubricant chamber to receive a lubricant and having an outlet for lubricant;
   a central shaft disposed longitudinally within said chamber;

a movable member tightly fitted within an inner surface of said main lubricant chamber, slidably mounted on said central shaft, and being movable towards said outlet to drive lubricant from the main chamber through said outlet by means of positive pressure on said lubricant by said movable member;

a motor having a drive shaft;

a fulcrum having opposite ends, and being attached at its proximal end to said housing;

drive means comprising a system of levers attached to said fulcrum and said movable member, and being driven by said motor;

electronic control means for controlling activation of said motor in accordance with a predetermined program.

2. Apparatus as claimed in claim 1 wherein said system of levers further comprises:

a primary lever having opposite ends, and being pivotally attached intermediate said opposite ends to the distal end of said fulcrum, and further being attached at a first end to said central shaft; and a linkage between the second end of said primary lever and said drive shaft of the motor whereby rotation of the motor drive shaft pivots said primary lever about said fulcrum to urge said movable member towards said outlet.

3. Apparatus as claimed in claim 2 wherein said linkage further comprises:

a primary link member having opposite ends, and being attached at its proximal end to said motor drive shaft; and a secondary link member having opposite ends, and being attached at its proximal end to the second end of said primary lever, and attached at its distal end to said distal end of said primary link member.

* * * * *